United States Patent [19]

Schuckmann

[11] Patent Number: 4,978,037

[45] Date of Patent: Dec. 18, 1990

[54] DISPENSER FOR PRODUCTS IN PASTE FORM

[75] Inventor: Alfred V. Schuckmann, Kevelaer, Fed. Rep. of Germany

[73] Assignee: Colgate-Palmolive Company, New York, N.Y.

[21] Appl. No.: 195,249

[22] Filed: May 18, 1988

[30] Foreign Application Priority Data

May 20, 1987 [DE] Fed. Rep. of Germany ....... 3716821
May 20, 1987 [DE] Fed. Rep. of Germany ....... 3716822

[51] Int. Cl.$^5$ .............................................. G01F 11/00
[52] U.S. Cl. .................................... 222/260; 222/391; 92/104
[58] Field of Search ............... 222/391, 260, 209, 207, 222/386, 213, 214, 257, 259, 405; 137/855; 92/104

[56] References Cited

U.S. PATENT DOCUMENTS

| 1,150,606 | 8/1915 | Kinealy | 92/104 |
|---|---|---|---|
| 1,490,496 | 4/1924 | Trevillian | 92/104 |
| 1,615,299 | 1/1927 | Bossi | 92/104 |
| 2,632,475 | 3/1953 | Elo | 92/104 |
| 2,774,518 | 12/1956 | Greene | 222/209 |
| 3,079,953 | 3/1963 | Mounteer | 92/104 |
| 3,217,933 | 11/1965 | Watson | 222/96 |
| 3,268,123 | 8/1966 | Spatz | 222/400.5 |
| 3,451,597 | 6/1969 | Watson, Jr. | 222/207 |
| 4,457,454 | 7/1984 | Meshberg | 222/207 |
| 4,629,097 | 12/1986 | Moore | 222/517 |
| 4,657,161 | 4/1987 | Endo et al. | 222/256 |
| 4,691,847 | 9/1987 | Ford et al. | 222/259 |
| 4,775,080 | 10/1988 | Mettenbrink | 222/391 |
| 4,776,496 | 10/1988 | Battegazzore | 222/209 |

FOREIGN PATENT DOCUMENTS

| 0051790 | 10/1981 | European Pat. Off. . |
| 3104726 | 12/1982 | Fed. Rep. of Germany . |
| 3435576 | 4/1986 | Fed. Rep. of Germany . |
| 3512650 | 10/1986 | Fed. Rep. of Germany ...... 222/207 |

Primary Examiner—Joseph J. Rolla
Assistant Examiner—Kenneth Noland
Attorney, Agent, or Firm—Nies, Kurz, Bergert & Tamburro

[57] ABSTRACT

The invention concerns a dispenser for the metered delivery of materials in paste form, with a tubular housing in which a follower piston in incrementally displaceable in the direction of discharge, and with an actuating key, positioned adjacent to a discharge nozzle, for the displacement of the surface of a pump diaphragm, fastened at its edges, from its rest position in the direction of the follower piston. The follower piston has a closable air vent. The pump diaphragm has a series of radially extending formations which materially increase its recovery capacity following a pumping stroke.

13 Claims, 5 Drawing Sheets

DISPENSER FOR PRODUCTS IN PASTE FORM

BACKGROUND OF THE INVENTION

A pump diaphragm, which forms a part of the dispenser mechanism, is known, for example, from U.S. Pat. No. 4,457,454. In this case, it was a matter of a dome-shaped body made of flexible material, with a central conduit for the product mass as well as a central inlet for the power to push the pump membrane back and forth.

A dispenser of the general type with which the present invention is concerned is disclosed in DE-OS No. 34 35576. There the piston, which is sucked upward during the course of the progressive reduction of the volume of pasty product before it, has a closable air-venting nozzle. Through this nozzle the air trapped between the surface of the product and the wall of the piston, during the insertion of the same, is able to escape. The filling operation is carried out with the dispenser in an inverted position, with the head pointing downward. A reclosing is needed in order to make it possible to generate the partial vacuum within the housing necessary for the later operation of the dispenser mechansim. In the case of the known solution the closure of the air-venting nozzle is accomplished by means of a stopper or plug. But due to the fact that there must be sufficient adhesion to hold the stopper in place, or even because some sort of snap-locking arrangement is necessary, the product mass is subjected to considerable stress. This can lead to an unwanted squeezing out of the same, for example, in the case of an improperly closed discharged nozzle. In the effort to improve the manageability of the rather small stopper, the latter is equipped with a large, frequently troublesome handling lug in the form of a disk.

SUMMARY OF THE INVENTION

The object of one aspect of the invention is to optimize a dispenser with regard to both manufacture and function and to provide a dispenser with a high degree of functional reliability, which offers advantages from the point of view of structure and assembly. There results a considerable degree of independence of the viscosity level of the product mass or masses and the associated recovery capacity of the pump diaphragm in its output position. The correspondingly high recovery forces are based upon the radially oriented corrugation of the surface of the pump diaphragm, that is to say, of the depressible segment of the pump diaphragm. The correspondingly extensive corrugation produces surfaces of different heights, which are joined via abrupt transitions and thus result in a surprisingly efficient reservoir of energy. There is thus no longer a purely annular, that is to say, rotation-symmetrical deflection of the diaphragm; on the contrary, a completing crosswise movement occurs in the plane of the arch. The correspondingly polydirectional deformation is also a significant source for the high level of stored energy. One configuration, which is particularly economical in terms of material and nevertheless highly effective, is produced by the simple expedient of forming the corrugation via the molding of the pump diaphragm. Covered by the term molding is a uniform initial thickness of the diaphragm, where the corresponding corrugation-counterpart results on the inner side of the diaphragm. An additional advantageous structural feature is that the surface of the pump diaphragm is subdivided into individual prominent fields, separated by grooves with hollow ridges lying along the radii. The radial ridges, when distributed at equal angles, function more-or-less like the spokes of a wheel; that is to say, they produce zones of equal loading. The hollowing of the ridges creates a virtually spring-free space.

A related feature, which is favorable from the point of view of molding technology, is that the hollow ridges project from the outer surface of a molded central barrel. The hollow shape produces a line-like root area by means of which a partial anchoring in the axial direction of the barrel results. Accordingly, the forces of deformation also pass over into this barrel-anchoring region. In other words the barrel is also at least partially involved in the deformation and thus also contributes to the reserve of spring energy. Likewise favorable to ease of molding is the fact that the hollow ridges are open at the bottom surface of the pump diaphragm. This, combined with the fact that the bottom of the grooves join upper side are convexly arched, produces a stabilization of the grooves and at the same time an enhanced degree of corrugation. The fields remaining between the ridges, which are preferably positioned at equal angles with respect to one another, have a sectorial shape. These fields each have a nearly trapezoidal outline but with a rounded base towards the perimeter. The prominent corrugation produced makes it even possible to form the pump diaphragm as an integrally molded part of the interior wall of the housing. The spring capability, which is attributable essentially to the shape of the energy reservoir, results even in those cases where the structural material is relatively hard, as, for example, in the case of polypropylene. Such material is highly suitable for the production of the tubular housing.

A structurally particularly simplified arrangment of the dispenser mechanism is achieved by making the barrel the carrier of the discharge nozzle. The barrel thereby assumes a further function, for example that of a mounting plug. In this case, the end of the discharge nozzle facing the barrel would then form a corresponding receptacle. The wall of such a receptacle would then stabilize the segment of the barrel comprising the male coupling in the manner of an external collar. An easy and convenient manipulation of the dispenser mechanism is afforded by an additional feature, namely, that a rocker lever, which carries the actuating key, engages the discharge nozzle. It is thereby advantageous that the barrel, along with the discharge nozzle, be angled in the direction of the rocker arm level pivot, thus forming an acute angle with respect to the central axis of the housing. In the case of a correspondingly coaxial arrangement of the barrel and discharge nozzle, this puts the discharge nozzle opening or orifice in a decentralized position, closer to the edge, permitting the precision application of the product to the delivered in metered quantities to the desired object, for example to a toothbrush. A further variation, advantageous from this point of view, is that the pump diaphragm with its rim be eccentrically mounted in the housing, in which case, for an extremely decentralized positioning of the opening of the discharge nozzle, it is expedient to relocate the assembly from the middle to a position closer to the rocker-arm lever pivot. It is further advantageous that the barrel of the pump diaphragm lie at an acute angle with respect to the plane passing through the rim of the pump. It is further helpful that the discharge nozzle be joined to the rocker-arm lever by means of at least a flexible segment. Such attachment points should lie diametrically opposite one another and obviously at right angles with respect to the plane of movement of the rocket-arm lever. A supplementary function is taken over by the barrel of the pump diaphragm if the top end of the barrel is equipped with a flap valve, which closes off only a part of the cross-sectional area of the discharge nozzle. The top edge of the barrel will thus form at the same time the seat for said valve. The portion of the cross-sectional area remaining open, on the other hand, is subdivided into channels, which are arranged to the outside of a tube seated in the barrel. Such an arrangement permits a stripe-like application of a supplementary or secondary product mass to the strand of product exiting the discharge nozzle. The supplementary product mass could, for example, be mouth wash component to be attached to a toothpaste. The secondary product is superimposed upon the principal product mass. The central tube, which is positioned in the barrel, passes down through the region of the mass of secondary product and forms the discharge bridge for the principal product mass, which has greater volume. Furthermore, it is advantageous, particularly in the case of a dispenser arranged according to claim 1, that the discharge nozzle be mounted so as to permit longitudinal movement in a shaft of the housing-head piece and with a portion of the top edge of its wall fashioned into a cutting edge, operating against the cap of the shaft, in order to part the extruded strand of product. The edge of the wall impinging upon the cap acts like a knife. Any smearing is virtually impossible. This operation can be effected with the use of a certain loading of the diaphragm body, which at the same time forms a return spring, not only moving the parting knife into the self-closing position but also supplying return force for the rocker-arm lever.

The present invention also makes possible the simpler and more rapid assembly of the dispenser by the provision of a follower piston having a unique air-venting construction which permits initial installation of the piston without discharge of the product within the dispenser. The wall of the air-venting nozzle itself provides the site for closure via the simple closure-bonding of the surface of the inner wall of the nozzle. There are fewer defective closures since it is no longer necessary to make use of a structural element requiring precise positioning. It is advantageous if, for example, the nozzle inner wall is cemented together. In the case of a permanently deformable material the closure can be effected by simple deformation of the nozzle wall. On the other hand it is possible, via appropriate mechanism means to apply, for example, a drop of rapidly hardening adhesive. One particularly advantageous solution is to provide the air-venting nozzle with an outwardly and downwardly projecting deformation segment. There is in this case always free and largely tolerance-independent access for the head of the machine. The correspondingly exposed position of the air-venting nozzle allows it to be accommodated on the piston without spatial difficulties. Closure-bonding via a pinch-welding of the air-venting nozzle is preferred in combination with a thermically suitable material. In view of the fact that nearly all parts of most dispensers of this type are made from thermoplastic plastic, this means of closure is the most recommended. When, for example, the pinch welding is effected in an axial direction via the application of a heating element to the deformation segment, no stress is imposed upon the product in the sense of the squeezing force discussed above, the contact heat escaping rapidly from the point of application. Moreover, the power needed to operate the welding tool is extremely small and by no means comparable to that needed for snap-locking against opposing force. A particularly secure, thermally induced drawing together of the nozzle orifice results if the top edge of the nozzle wall is beveled to produce the approximate shape of a cone. The beveled edge tapers inward, toward the center. The corresponding sloping surface promotes the self-location of this lip segment in the processing machinery.

DETAILED DESCRIPTION

The housing 1, which has the shape of a long cylinder, contains a pasty principal product mass I, which occupies the greater share of the volume and is superimposed by the mass of supplementary or secondary product II, accommodated in the head region. The material constituting principal product mass I can be a toothpaste. The secondary product mass II is, for example, a mouth wash component, likewise a material having a pasty structure. It is applied in the form of stripes to the strand passing out through the opening O in the head region and can be colored.

Output is effected by means of a pump mechanism D, lying in the dispenser head which forms a pumping chamber with a pistion 2, positioned beneath the principal product mass I, which can be displaced incrementally in the direction of discharge, that is in the direction of the arrow X. The edge lips 2' of the piston provide sealing action as they pass along the cylindrical interior wall of the housing 1'. The piston has the shape of a cup. The edge lips 2', united by means of a transverse wall 2", taper outward in opposite directions. The housing 1 is open at the bottom. It is filled from that direction. The supplementary or secondary product mass II, having the smaller volume, is filled in first, then the principal product mass II. This all takes place with the dispenser inverted, the head pointing downward. After filling, the piston is inserted into the housing from the open side of the dispenser. The air trapped between the surface of the mass of principal product I and the piston 2 is forced out by way of escape zones. Known methods for accomplishing this include, for example, the roughening or lengthwise grooving of the first part of the interior wall of the housing. Another proposal is to provide, during molding, for a central nozzle to permit the escape of air, which is then closed by means of a plug.

In the case of the illustrated embodiment of the invention, the piston 2 is equipped at the center with an air-venting nozzle T. This is an integrally molded part of the piston 2. The air-venting nozzle T is a small tube 3 projecting from the lower face 2' of the piston 2 and initially bored all the way through, which is positioned at the highest part of the bulkhead or lower face 2" of the piston 2 in order to allow all of the air to escape and thus prevent the formation of air bubbles. This evacuation, once completed, is followed by the closure-bonding of the inner surface 3' of the nozzle wall, effected via the deformation of the wall material. Closure in the case of a metal tube is effected by means of the radial pinching of the metal. But if the piston is made of a thermoplastic material, a pinch-weld is employed to seal the air-venting nozzle T. In any case, the tube 3 projects far enough from the body of the piston to provide a large easily accessible deformation segment for closure. The operation of closure takes place without imposing any force upon the piston, that is to say, without the need to impose any force in the direction of the product I/II, which could squeeze it out. The deforming operation makes use of the application of radially inwardly directed forces to the outer wall of the tube. The thermic melting back of the deformation segment of the air-venting nozzle T is effected in an essentially axial direction and takes place so spontaneously that the corresponding axially moving melt puddle encounters virtually none of the resistance leading to the imposition of stress upon the product. It is here advantageous that the outer edge 3" of the nozzle wall be tapered into a cone. The base of the cone is turned toward the lower face 2" of the piston 2. A rotation-symmetrical annular tip is thus melted back, by a unit which practically guides itself into the opening in the tube. The closed position is illustrated in FIG. 1a.

Figures 1, 1A:
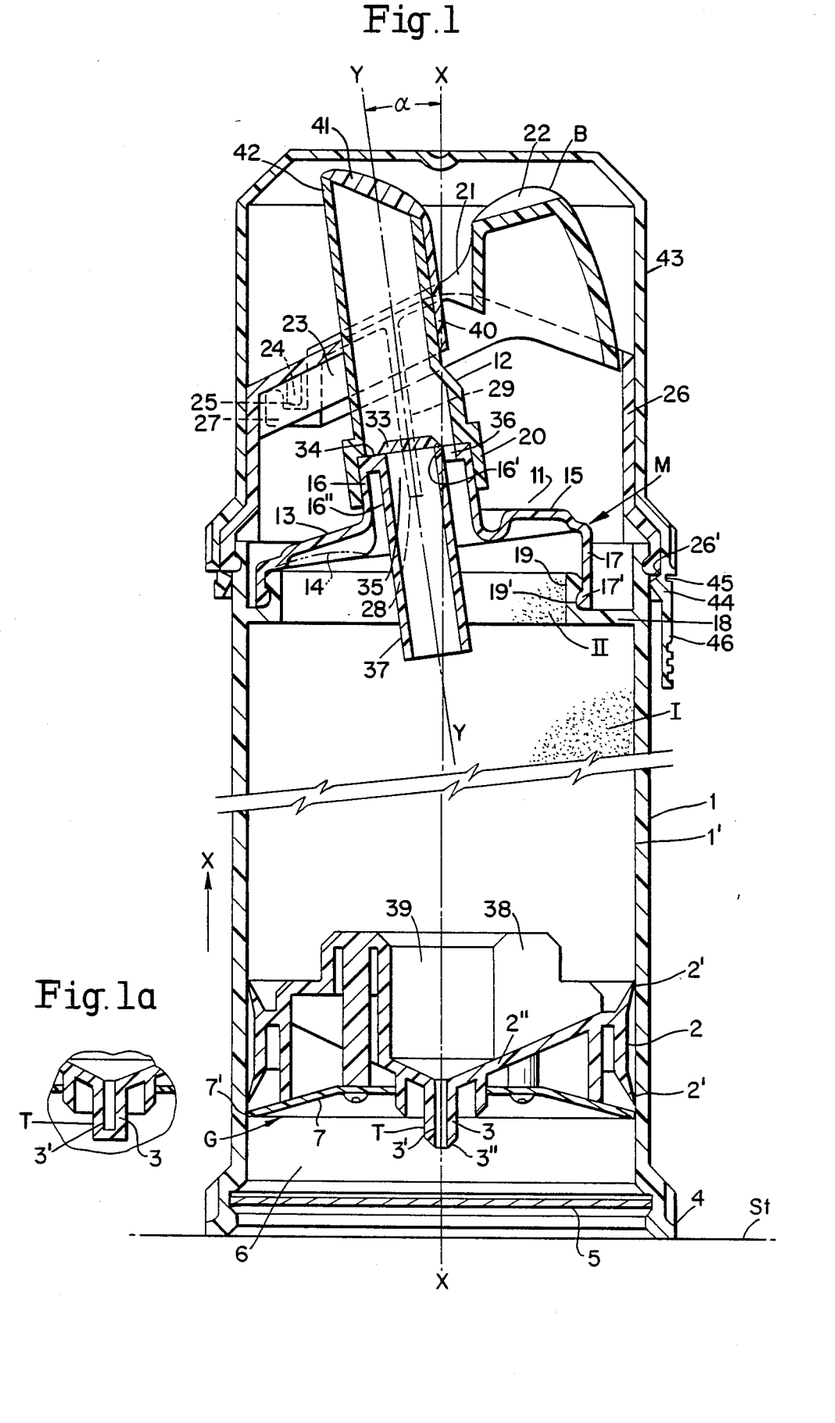
FIG. 1 is a vertical cross-section of the dispenser shown in the rest position, with the air-venting nozzle still open.
FIG. 1a shows the air-venting nozzle in the closed state.

Although the piston 2 already provides the lower closure of the product reservoir chamber, that is to say, the closure facing the surface ST, it is nevertheless possible to snap-lock a cover disc 5 into the region of the outwardly expanded base-rim 4 of the dispenser (see FIG. 1). The cover disc 5 has a laterally positioned vent opening 6.

The travel of the piston 2 in one direction only is achieved by locking means G. In the case of the dispenser according to FIG. 1, this is a so-called clamp module 7 in the form of a star, made of spring steel, with a prong 7' oriented in a radially outward direction. The diameter spanned by the prong ends, projected into one plane, being somewhat larger than the interior diameter of the housing 1, the prong ends, acting as angled supports against the housing inner wall 1', prevent the movement of the piston in the direction opposite that of the arrow X. The clamping module lies at the back of the piston, that is to say, on the side turned toward the surface ST. The mounting of the same can be effected by the use of heat by providing meltable lugs, which project through holes in the module and are then melted to form rivets.

Figure 5:
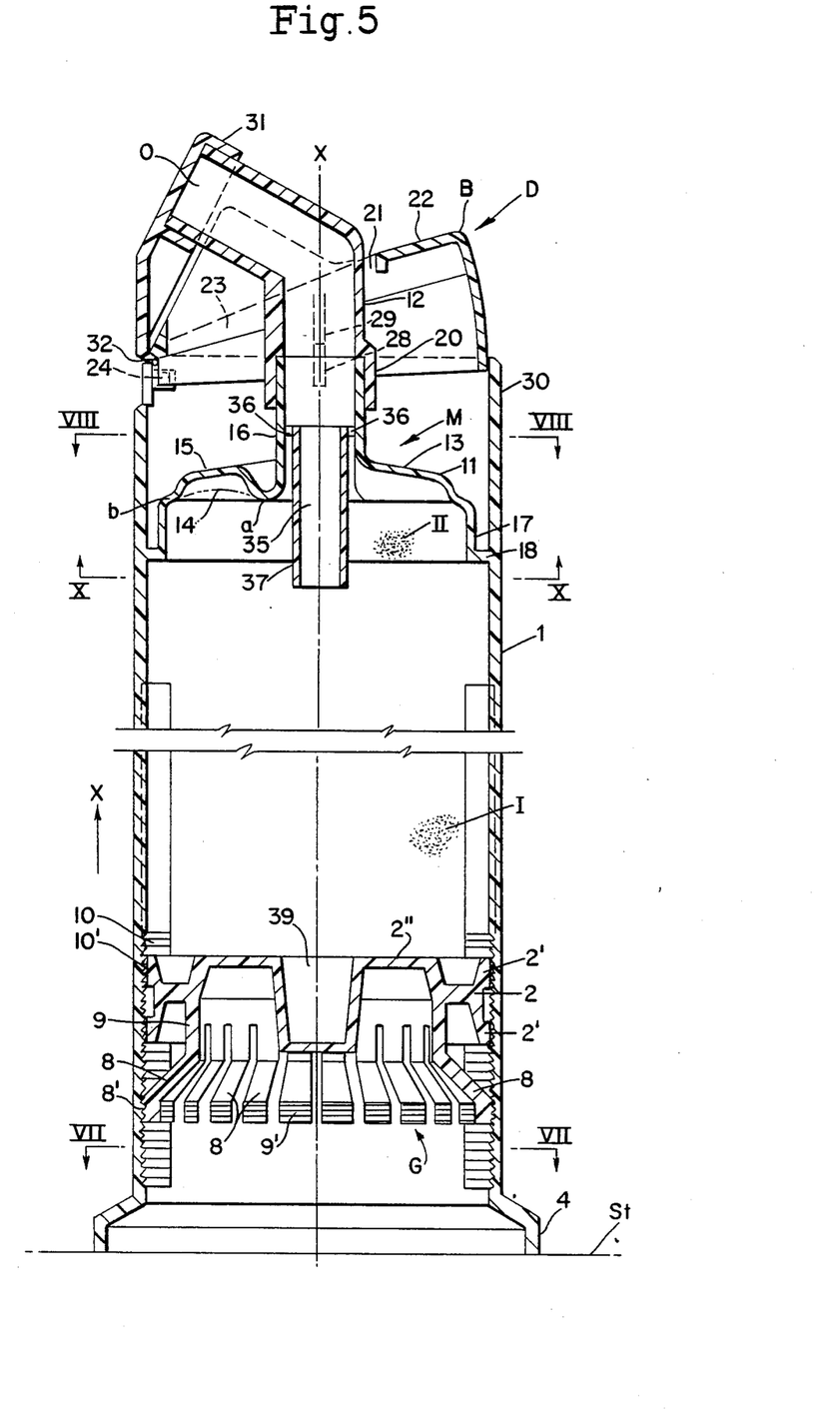
FIG. 5 is a vertical section through a modified version of the dispenser in the rest position.

In the case of the dispenser shown in FIG. 5, the locking means G are an integral part of the piston 2. Here it is a matter of a so-called ratchet. Projecting form the transverse wall 2" of the piston 2 and equidistantly arranged around the perimeter of the same, on the side turned toward the surface ST, are ratchet fingers 8. These radiate outward from said transverse wall 2" to form the annular wall 9. The distal ends of the ratchet fingers 8 exhibit a cross-wise corrugation 8'.

This latter consists, when viewed in cross-section, of more-or-less sawtooth-like segments comprising screw threads. The ridges of the same 9' mesh with horizontal but correspondingly shaped tooth gaps 10' of the serrations 10, molded into the interior wall 1' of the housing. The support function is provided by the horizontal, steep flanks of the diametrically opposed serrations 10, while the adjacent, angled sides permit the relatively frictionless travel of the piston 2 in the directin of the arrow X. The extensive separation of the finger crown forming the ratchet fingers and the axial movement, produced by screw-pitch, of the crosswise corrugation 8' of the piston 2, in the case of a purely horizontal orientation of the tooth gaps 10', produces in every instance a secure support interlock, even if the distance through which the piston is lifted is less than the axial length of a tooth interval. Each of the serrations covers in the horizontal plane an angle of arc of less than 90 degrees, so that several of the peripherally roughened ratchet fingers 8 impinge upon a smooth section of the interior wall 1' of the housing.

The edge lips of the piston 2 radiate outward likewise here; but the contact surface of the inner wall is greater than the distance between the apex of one tooth and that of the next of the serrations 10 so that sealing is effected as the piston travels.

The pump mechanism D positioned at the opposite end of the dispenser, at the head, comprises a pump membrane M. The latter is a bellows or deformable element, which can be depressed in the direction of the piston 2 and whose pump diaphragm surface wall 11 always returns spontaneously, on being released, to its rest position, as shown in FIGS. 1 and 5. This element (M) is either produced as a separate structural part (see FIG. 3) or is molded as a materially integral part of the housing 1, in the head region. This latter arrangement is possible due to the peculiar surface structure of the pump diaphragm M, which permits it to function properly in spite of the relative hardness of the material forming the housing. The passage of the product is via the center by way of a discharge nozzle 12, which is a free-standing structure projecting above the upper side of the pump diaphragm M.

Figure 3:
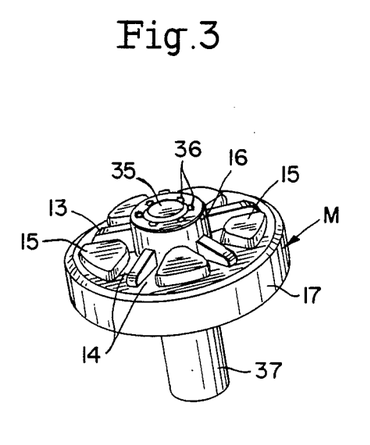
FIG. 3 is a perspective view of the pump diaphragm by itself.
Figure 8:
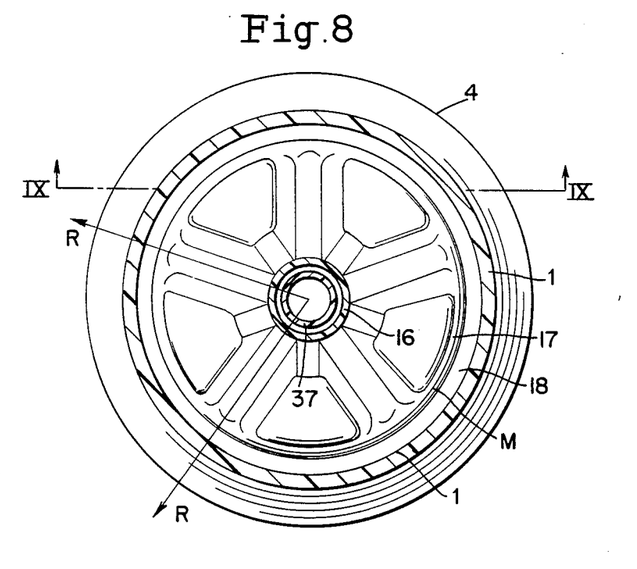
FIG. 8 is a section along line VIII—VIII in FIG. 5.
Figure 9:
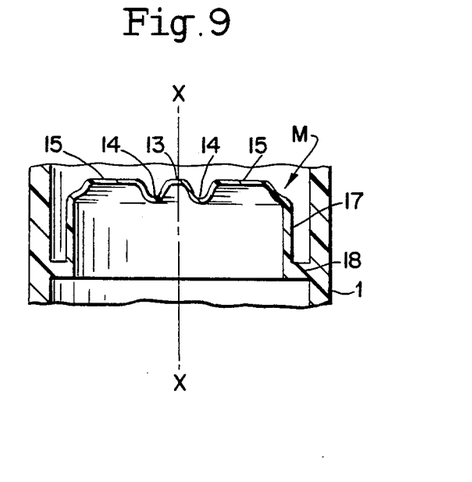
FIG. 9 is a section along line IX—IX in FIG. 8.
Figure 10:
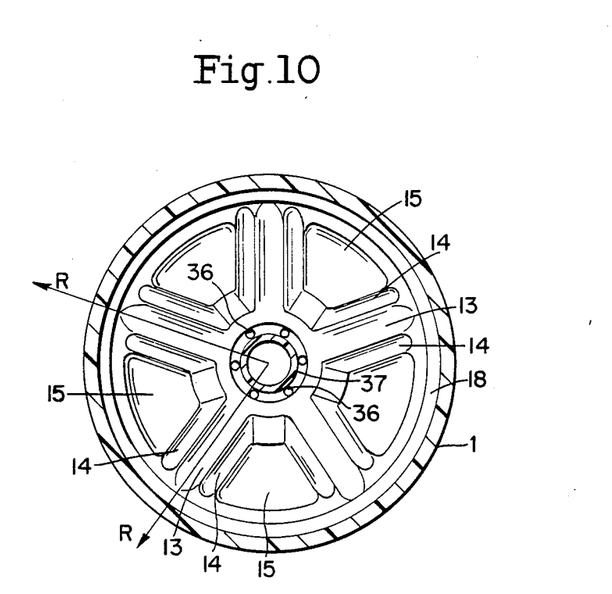
FIG. 10 is a section along the line X—X in FIG. 5.

The special surface structure of the diagphragm consists of the corrugation of its surface oriented along the radii. This is shown in FIG. 3. As illustrated, the rotation-symmetrical corrugation of the diaphragm surface creates regions with different axial heights. The radial orientation is particularly evident in FIGS. 8 and 10. It is created by the molding of the surface wall 11 of the pump diaphragm, which has approximately the same thickness throughout.

Figure 2:
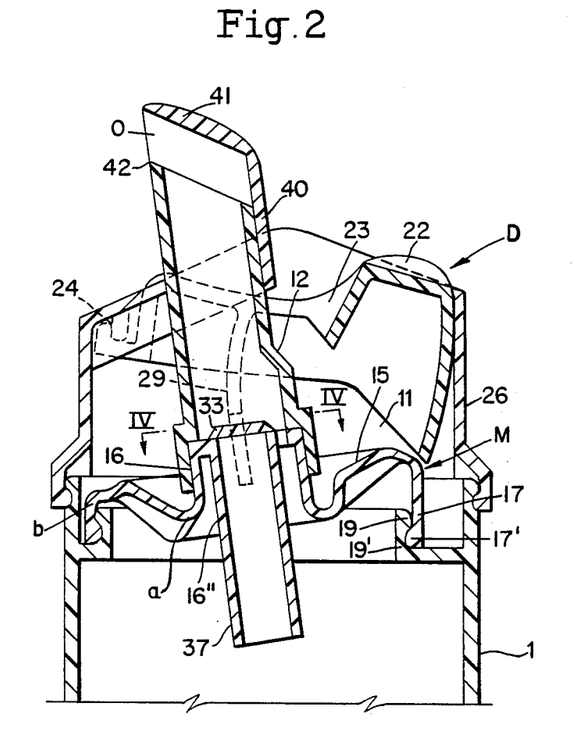
FIG. 2 shows the upper portion of the dispenser in the discharge position.

Form-determining elements of the radially oriented structure are the hollow ridges 13, at equal angular intervals, which divide the surface into five parts. Extending between the ridges 13 are the grooves 14, with a V-section though rounded at the bottom, and the adjacent fields 15, which virtually fill out the intervening space. Seen from the above (FIGS. 8 and 10) the fields are prominent. The plane of the plateau-like fields 15 is approximately that of the spines of the hollow ridges 13. The spines of the hollow ridges and the upper side of the fields 15 are thus the higher portions of the essentially slightly concavely arched pump diaphragm surface wall 11, while the bottoms of the grooves 14 and peripheral area surrounding the fields 15 are assigned to a more deeply lying portion, that is to say, to one forming another plane. The U-shaped ridges 13, open in the direction of the product mass, are rooted in the outer surface of a centrally molded barrel 16. The latter has a cylindrical cross-section and projects above the upper side of the pump diaphragm surface wall 11 and prossesses a diameter, which is approximately one quarter of that of the pump diaphragm. However, the fields 15, with their sector-like outline and shape approaching approximately that of a trapezoid, are clearly set back from the outer surface of the barrel and pass under a circumferentially wavery ring groove into the downwardly oriented end of the barrel 16. This produces a definite fold ring a (FIGS. 2 and 5). The external fold ring is designated with b. It forms the rim of the pump diaphragm surface wall 11. Projecting from this rim is an axially oriented wall 17, which in the case of the embodiment shown in FIG. 5 is attached to the housing 1 via an annular shoulder 18.

In FIG. 1 this horizontal shoulder 18, which is perpendicular to the lengthwise central axis X—X of the dispenser, is continued upward in the form of a cylindrically shaped, upwardly projecting collar 19 onto which the pump diaphragm M, executed as a separate structural element, is clipped or snapped. The annular wall 17 of the diaphragm has a protuberant snap-lock ring 17' on its inner edge, which interlocks with a corresponding snap-locking groove 19' of the collar. The lower edge of the annular wall 17 thereby abuts the upper side of the annual shoulder 18.

The ridges 13 and their U-shaped zone of transition with the outer wall of the barrel 16 and the relieved or corrugated surface, formed by elements on different planes, combine to produce a powerful energy reservoir, in which case the portions representing the fields 15 create partial steepening, but the margins or sides of these fields, seen from the edge, create a practically zig-zag structure, with elements of different side length. In the compressed state, the U-legs of the radially oriented hollow ridges 13, which have the shape of a U when viewed in cross-section, enter into a diverging fold position, so that flexing points, comparable to those at a and b, result also in the direction of the periphery. A further measure to increase the spring-energy storing capacity of the pump diaphragm M, which has the appearance of a wheel due to the radially oriented hollow ridges and the hub-like barrel, consists in the fact that the bottom of the grooves, viewed from the upper side, is convexly arched. This optional feature is indicated in FIGS. 1 and 5 by dot-dash lines. The extended position of the bottom of the grooves 14 is shown by means of solid lines.

The upper end of the barrel 16 arises the discharge nozzle 12, the latter being either an integral part of the same or a separate tubular nozzle element, as shown in the drawings. The means of attachment in the latter case is a plug-socket arrangement. A press fit is employed. The attachment end of the nozzle element forms a receptacle or socket 20 to receive the upper end of the barrel 16. The socket portion has a larger diameter than the remainder of the discharge nozzle 12.

The downward stroke of the pump diaphragm M is effected by means of an actuating mechanism B adjacent to the discharge nozzle 12. This is formed by a single-armed rocker-arm lever 21. The latter, viewed in cross-section, has the shape of a U. It is a molded part whose outer end is raised to form an actuating surface 22. This region is in the U-ridge zone, whereas the free ends at the parallel U-legs of the actuating device terminate in a rocker-arm pivot 24. This pivot element 24 is constituted by a projecting lug 15 of a snap-locking head-piece 26 of the housing. A hook-shaped terminal segment 27 of the U-legs 23 snaps under the stationary lug. The rest position is stop-defined.

The actuating mechanism B is retained in the rest position by the resilient pump diaphragm M. It is possible here to exploit a slight pretensioning. The coupling between the pump diaphragm M and the actuating assembly B is accomplished by molded elements. These include two coupling segments 28, which are positioned on diametrically opposite sides of the outer jacket of the plug-in socket 20 of the discharge nozzle 12. These segments 28, per an outwardly directed course, pass into curved segments 29, which run parallel to the discharge nozzle 12. These curved segments 29, which are positioned upon the U-legs 23, are of such a length that they compensate for the differing courses of movement of the actuating assembly B and the pump diphragm M.

FIG. 5 illustrates another embodiment in which the dispenser head is formed by an extension of the housing 30 in the direction of the head. Here, too, the free end of the discharge nozzle 12 projects upward above the unit. The designation numbers employed are those used for the corresponding parts in the other embodiments.

Figure 6:
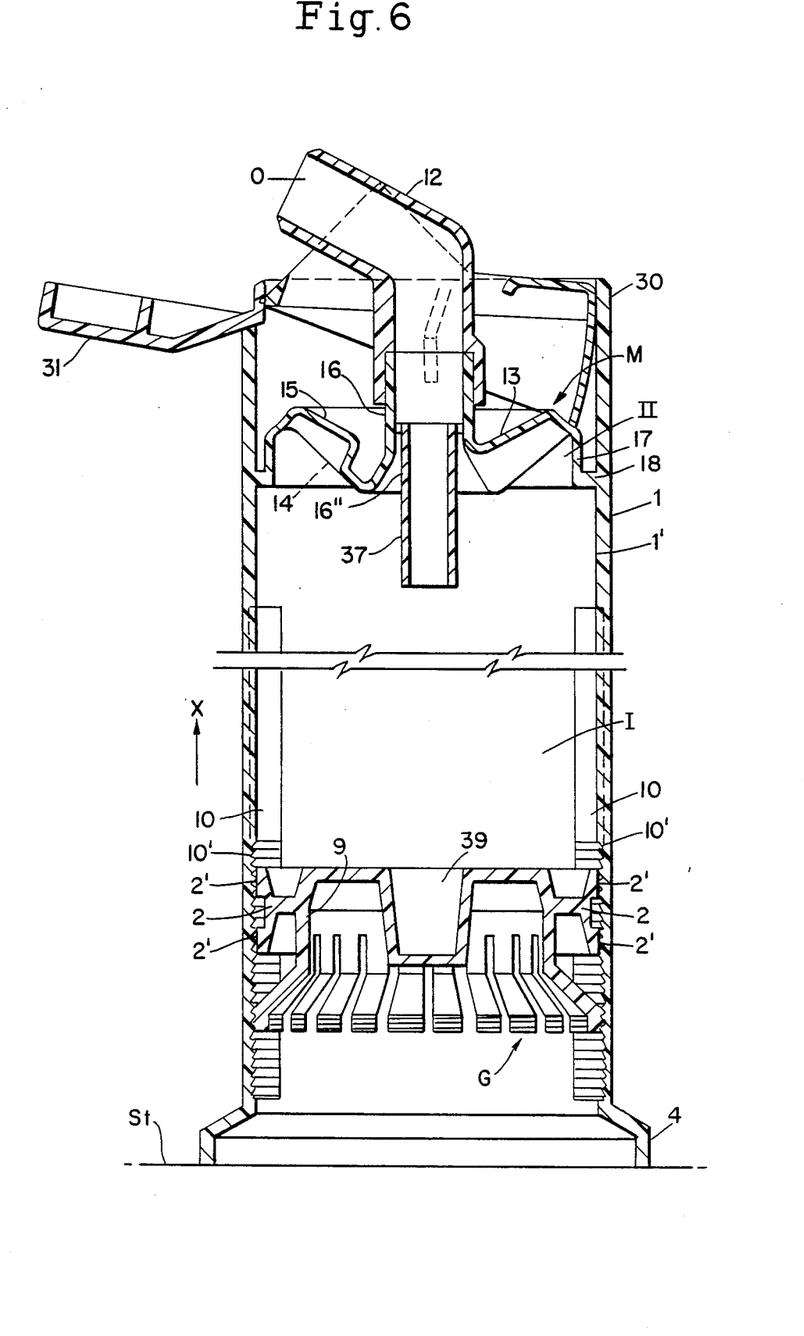
FIG. 6 is a similar view but in discharge position.
Figure 7:
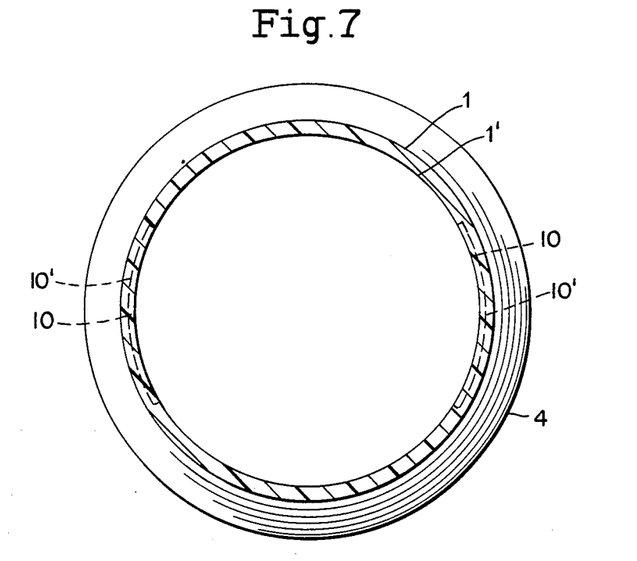
FIG. 7 is a section along line VII—VII of FIG. 5.

Although here at least the case of the discharge nozzle 12 coincides with the central axis X—X of the dispenser, the outboard end of the nozzle 12 is bent to form an upwardly inclined terminal segment, which makes an angle of approximately 30 degrees with the horizontal. A closure cap 31, forming a part of the extension of the housing 30, can be removed for the purpose of discharging the contents. In this latter case it occupies the position shown in FIG. 6. When closed, the cap secures the mechanism against movement since the cap forms a socket to receive the cylindrical tip of the discharge nozzle 12.

In the embodiment shown in FIG. 1, the barrel 16, along with the coaxially attached discharge nozzle 12, is angled in the direction of the rocker arm lever pivot 24 and forms an acute angle with respect to the longitudinal central axis X—X of the housing. The axis of the barrel carries the designation Y—Y. The acute angle alpha is approximately 15 degrees. As a result of this angular arrangement the orifice of the discharge nozzle 12 is closer to the periphery of the housing than it would otherwise be, making possible a more precise aiming of the product discharge. Of course, the corresponding lateral respositioning of the nozzle leaves somewhat more room free for the actuating surface 22 of the activating mechanism B. Also evident in FIG. 1 is the fact that the rim of the pump diaphragm M, that is to say, the annular wall 17, is positioned eccentrically within the housing, and likewise in closer proximity to the pivot point 24. It is here also noteworthyl that the barrel 16 of the pump diaphragm M forms an acute angle with respect to the plane passing through the rim of the pump. The rim is higher to the right than to the left. The annular shoulder 18, on the other hand, retains its horizontal position.

Whereas the dispenser of FIG. 5 operates according to the hydraulic principle, as described in EP-PS No. 0051790, the dispenser per FIG. 1 makes use of a valve flap 33. The latter is molded as a freely standing structure within the discharge nozzle 12, at the level of the socket 20 and projects into the cross-sectional area of the nozzle. The material of the valve flap 33 is thinner at the point of attachment in order to increase its flexibility, the result being the film hinge 34. The top edge 16' of the barrel 16 forms the seat for the valve.

Figure 4:
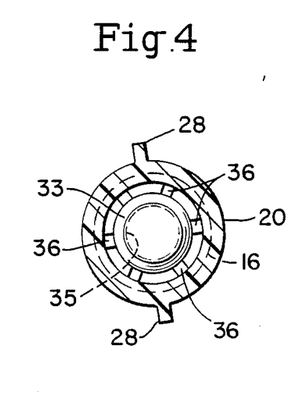
FIG. 4 is a section along line IV—IV of FIG. 2.

The valve flap 33 closes off only a portion of the cross-sectional area of the discharge nozzle 12 or of the central opening 35 of the pump diphragm M. The area remaining at the periphery, an annular zone interrupted only by the hinge 34, has channels 36, which are parallel with the opening 3. As shown in FIG. 4, the channels 36 are uniformly arranged.

The channels 36 are positioned externally with respect to a tubular element 37, mounted within the barrel 16. The outer wall of this tube 37 is radially separated from the corresponding cylindrical interior wall 16" of the barrel 16, the outer wall being therefore surrounded by secondary product mass II in the zone near the barrel of the pump diaphragm M. The channels, arranged in a ring, extend upward from this point. The free end of the tube 37, on the other hand, dips down into the mass of the principal product 1. The tube 37 thus constitutes a discharge bridge for this mass, while the hood-like diaphragm body provides the reservoir for the mass of supplementary or secondary product, which, on passage through the channels 36, is deposited in the form of stripes upon the product strand being discharged. The supplementary product mass II benefits from the backfilling pressure of the principal product mass I and, with the gradual removal of the latter, is lifted in the direction of discharge, that of the arrow X. The volume compensation is such that the quantity present of supplementary or secondary product II is consumed as the principal mass is discharged.

In order to keep waste to a minimum, the cross wall 2" of the piston 2 has been designed to conform as closely as possible to the inner contour of the pump diaphragm. it possesses, on the side facing the nozzle, protuberant structures 38, with a central recess 39 to receive, without interference, the lower end of the relatively long tube 37.

The dispenser mechanism per FIG. 1 slides into a shaft 40 of the housing-dispenser head 26. This shaft 40 is closed at the top. The corresponding sloping roof carries designation number 41 and is called the cover. The pertinent end of the discharge nozzle 12 projects like a chimney above the upper side of the pot-shaped head-piece 26, which has openings for the actuating mechanism and the discharge nozzle. The orifice O of the discharge nozzle 12 is correspondingly angled, the sides being parallel to one another, the angle being measured with respect to the lengthwise central axis X—X. These parts are shaped and arranged in such a way that a portion of the upper edge of the discharge nozzle 12 is able to function as a cutting edge against the inner side of the cover 41 of the shaft 40, in order to part the extruded strand of product. Depending upon the contour chosen for the distal end of the discharge nozzle 12, this cutting edge can be either a round knife or a flat knife. In the case of the illustrated embodiment the initially round lower portion of the discharge nozzle 12 gradually assumes an approximately quadrilateral cross-section. In any case, the parting cut is so precise that no residues remain. A correspondingly precise shaping of the product strand results in turn.

The dispenser illustrated in FIG. 1 is covered protectively with a cap 43. The latter can be molded with an annular bead 44 at the rim to prevent tampering with the product prior to sale. The annular bead 44 fits over the rim 26' of the mounted head-piece 26. The annular head has a steeper and a flatter side. The flatter side facilitates the snapping of the cap 44 onto the head-piece 26. Associated with the annular bead 44 is a parting groove 45. Removal of the anti-tampering seal, which has the form of an annular band, is effected by a pull-tab 46, which is free-standing but does not project beyond the rim of the cap 43 and is straightened with reference to the support surface ST. The diameter of the rim in question is equal to that of the base flange 4. The projecting outer surfaces of these bands protect the sides of the housing by keeping adjacent containers at a distance, whether in shipping package or on store shelves. The labelling applied to the cylindrical surface of the housing 1 is always thereby optimally protected.

The dispenser operates as follows:

Following removal of the cap 43, the actuating key B is depressed. This produces a deformation of the pump diaphragm surface wall 11. The latter also functions as a return spring. The pressing down diminishes the volume in the dispenser interior. Both the supplementary or secondary product mass II and the principal mass I are submitted to pressure. The mass of principal product I passes through the tube 37 into the discharge nozzle 12 and out finally through the orifice O. The superimposed secondary mass II flows through the channels 36 into the region forming the nozzle. This secondary product II is then applied to the outer surface of the exiting strand of principal product I in the form of stripes. The valve flap 33 does not stand in the way during the pressing out of the mass of product. It is pushed out of the way by product, pivoting on the hinge 34.

On release of the actuating mechanism B, a partial vacuum develops within the housing I. The pump diaphragm returns to its position of rest and draws the piston 2, including the product before it, upward in the direction of arrow X. In the case of the unit illustrated in FIG. 5, the return of product still within the discharge nozzle 12, is withdrawn from the tube 37. To that extent, a valving function takes place at this point. This function is further promoted by the expansion of the interior diameter in the upper segment of the discharge nozzle. The arising partial vaccum effects in the case of the unit in FIG. 1 the closure of the valve flap 33 so that here, too, the piston 2 is drawn upward.

I claim:

1. A dispenser for materials in paste form comprising a tubular housing, discharge means at one end of said housing, piston means located in said housing and being incrementally displaceable towards said one end, a pump diaphragm connected around its peripheral edge to said housing and being displaceable from a rest position towards said piston means to cause discharge of material from said housing through said discharge means, said diaphragm including barrel means connected with said discharge means and a plurality of corrugations extending radially between said barrel means and said peripheral edge, said corrugations being generally U-shaped flexible hollow ridges which are open at the lower surface of said diaphragm towards said piston means, said ridges flexing into a spread position as said diaphragm is displaced from its rest position towards said piston means, the ridges in said spread position providing a force which enhances recovery of said diaphragm to its rest position following a pumping stroke.

2. A dispenser as claimed in claim 1, wherein said diaphragm is of substantially uniform thickness throughout.

3. A dispenser as claimed in claim 1, wherein said ridges divide said diaphragm into a plurality of fields extending radially between said barrel means and said peripheral edge.

4. A dispenser as claimed in claim 3, wherein said fields include raised sectors and groove means separating said sectors from said ridges.

5. A dispenser as claimed in claim 4, wherein said sectors are generally trapezoidal in shape.

6. A dispenser as claimed in claim 4, wherein said groove means are open on the upper surface of said diaphragm.

7. A dispenser as claimed in claim 1, wherein said housing and said diaphragm are of plastic material and are integrally molded together.

8. A dispenser as claimed in claim 1, wherein said discharge means includes a discharge nozzle mounted on said barrel means.

9. A dispenser as claimed in claim 8, comprising actuating means engaging said nozzle and being movable to displace said diaphragm.

10. A dispenser as calimed in claim 9, wherein said barrel means and said nozzle lie at an acute angle with respect to the central axis of said housing.

11. A dispenser as claimed in claim 1, said diaphragm and its peripheral edge being mounted eccentrically within said housing, said barrel means lying at an acute angle with respect to the plane passing through said peripheral edge.

12. A dispenser as claimed in claim 11, wherein said discharge means includes a discharge nozzle connected to said barrel, said actuating means including a rocker arm lever joined together with said discharge nozzle via at least one flexible segment.

13. A dispenser as defined in claim 1 wherein the top of said hollow ridges slopes upwardly from said peripheral edge toward said barrel means.

* * * * *